United States Patent
Lee et al.

(10) Patent No.: US 12,506,224 B2
(45) Date of Patent: Dec. 23, 2025

(54) POROUS SUBSTRATE FOR SEPARATOR AND SEPARATOR FOR ELECTROCHEMICAL DEVICE COMPRISING SAME

(71) Applicant: LG ENERGY SOLUTION, LTD., Seoul (KR)

(72) Inventors: So-Yeong Lee, Daejeon (KR); Ji-Eun Kim, Daejeon (KR); So-Jung Park, Daejeon (KR); Dong-Wook Sung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 18/036,748

(22) PCT Filed: May 6, 2022

(86) PCT No.: PCT/KR2022/006519
§ 371 (c)(1),
(2) Date: May 12, 2023

(87) PCT Pub. No.: WO2022/235126
PCT Pub. Date: Nov. 10, 2022

(65) Prior Publication Data
US 2023/0411794 A1 Dec. 21, 2023

(30) Foreign Application Priority Data

May 7, 2021 (KR) .................. 10-2021-0059551

(51) Int. Cl.
*H01M 50/491* (2021.01)
*H01M 10/0525* (2010.01)
(Continued)

(52) U.S. Cl.
CPC ....... *H01M 50/491* (2021.01); *H01M 50/417* (2021.01); *H01M 50/451* (2021.01); *H01M 10/0525* (2013.01); *H01M 50/494* (2021.01)

(58) Field of Classification Search
CPC ............. H01M 50/491; H01M 50/417; H01M 50/451; H01M 10/0525; H01M 50/494;
(Continued)

(56) References Cited

U.S. PATENT DOCUMENTS

2012/0273117 A1* 11/2012 Suzuki ................ H10N 30/086
156/154
2014/0193716 A1 7/2014 L'Abee et al.
(Continued)

FOREIGN PATENT DOCUMENTS

| CN | 106784528 A | 5/2017 |
| CN | 106981608 A | 7/2017 |

(Continued)

OTHER PUBLICATIONS

JP-2015120786-A machine translation (Year: 2023).*
(Continued)

*Primary Examiner* — Matthew T Martin
*Assistant Examiner* — Bartholomew A Hornsby
(74) *Attorney, Agent, or Firm* — Morgan, Lewis & Bockius LLP

(57) ABSTRACT

The present disclosure relates to a porous substrate for a separator. The porous substrate according to the present disclosure has a small and uniform pore size, thus having excellent physical strength and durability, and can secure a high dielectric breakdown voltage, resulting in a low short-circuit occurrence rate.

18 Claims, 3 Drawing Sheets

(51) Int. Cl.
*H01M 50/417* (2021.01)
*H01M 50/451* (2021.01)
*H01M 50/494* (2021.01)

(58) Field of Classification Search
CPC .. H01M 50/463; H01M 50/40; H01M 50/403; H01M 50/409; H01M 50/489
See application file for complete search history.

(56) References Cited

U.S. PATENT DOCUMENTS

| | | | |
|---|---|---|---|
| 2014/0287295 A1* | 9/2014 | Honda | B32B 5/022 |
| | | | 429/144 |
| 2015/0203686 A1* | 7/2015 | Ozaki | H01M 50/451 |
| | | | 106/286.5 |
| 2019/0159180 A1 | 5/2019 | Ly et al. | |
| 2021/0050575 A1* | 2/2021 | Park | H01G 9/02 |
| 2021/0210818 A1 | 7/2021 | Park et al. | |

FOREIGN PATENT DOCUMENTS

| | | | | |
|---|---|---|---|---|
| JP | 2883726 | B2 | | 4/1999 |
| JP | H11-329390 | B2 | | 11/1999 |
| JP | 3235669 | B2 | | 12/2001 |
| JP | 2002-141046 | A | | 5/2002 |
| JP | 3422496 | B2 | | 6/2003 |
| JP | 20130087367 | A | * | 5/2011 |
| JP | 5422562 | B2 | | 2/2014 |
| JP | 2015120786 | A | * | 7/2015 |
| JP | 6358711 | B2 | | 7/2018 |
| JP | 2019-003951 | A | | 1/2019 |
| JP | 2019143008 | A | * | 8/2019 |
| JP | 2021-503828 | A | | 2/2021 |
| JP | 2021038379 | A | * | 3/2021 |
| KR | 10-2009-0023345 | A | | 3/2009 |
| KR | 10-2013-0087367 | A | * | 8/2013 |
| KR | 20130087367 | A | * | 8/2013 |
| KR | 10-2014-0017543 | A | | 2/2014 |
| KR | 10-2014-0018876 | A | | 2/2014 |
| KR | 10-2014-0018877 | A | | 2/2014 |
| KR | 10-2015-0013107 | A | | 2/2015 |
| KR | 10-1656760 | B1 | | 9/2016 |
| KR | 10-2018-0102408 | A | | 9/2018 |
| KR | 10-2019-0105881 | A | | 9/2019 |
| KR | 10-2020-0000372 | A | | 1/2020 |
| KR | 10-2020-007745 | A | | 1/2020 |
| KR | 10-2020-0007745 | A | | 1/2020 |
| KR | 10-2020-0012802 | A | | 2/2020 |
| KR | 10-2021-0020846 | A | | 2/2021 |
| WO | 2020/195380 | A1 | | 10/2020 |

OTHER PUBLICATIONS

KR20130087367A machine translation (Year: 2023).*
International Search Report (with partial translation) and Written Opinion dated Aug. 23, 2022, issued in corresponding International Patent Application No. PCT/KR2022/006519.
Request for the Submission of an Opinion issued in Korean Patent Application No. 10-2022-0056264 dated Jan. 11, 2023.
Written Decision on Registration issued in Korean Patent Application No. 10-2022-0056264 dated May 4, 2023.
Office Action issued on May 20, 2024 in Japanese Patent Application No. 2023-531083.
Extended European Search Report dated May 22, 2025 in corresponding European Patent Application No. 22911591.0.

* cited by examiner

[FIG. 1]
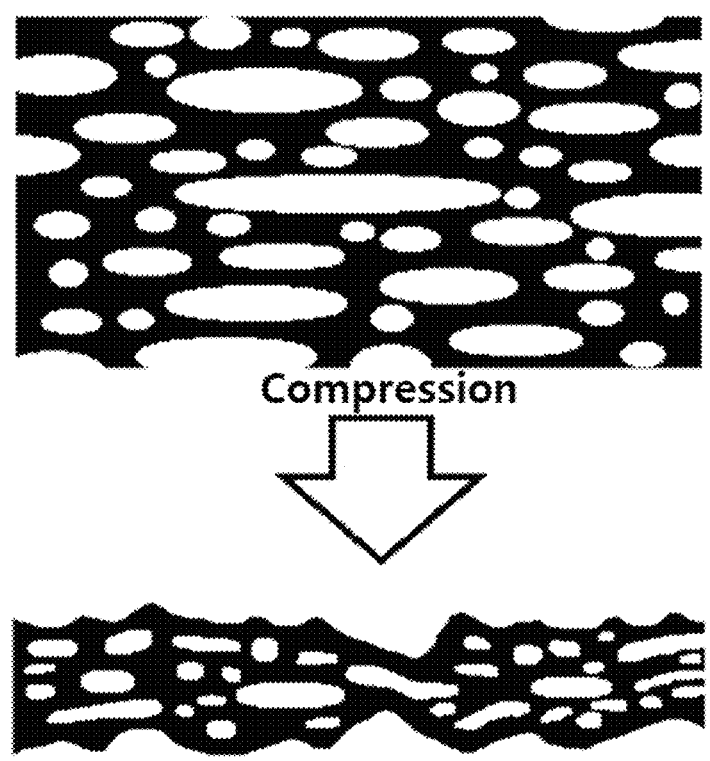

[FIG. 2]
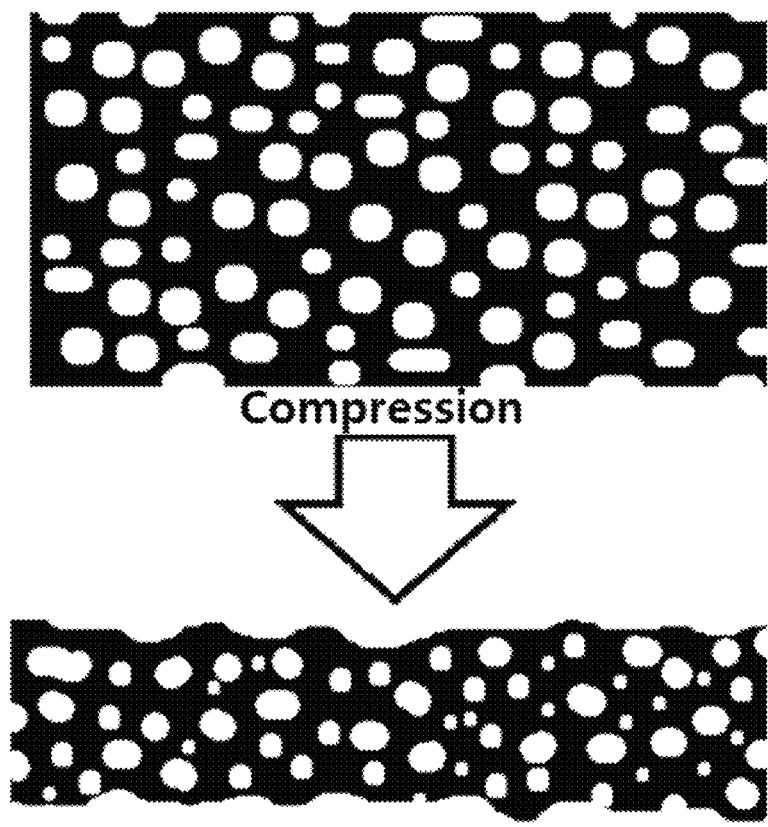

[FIG. 3]
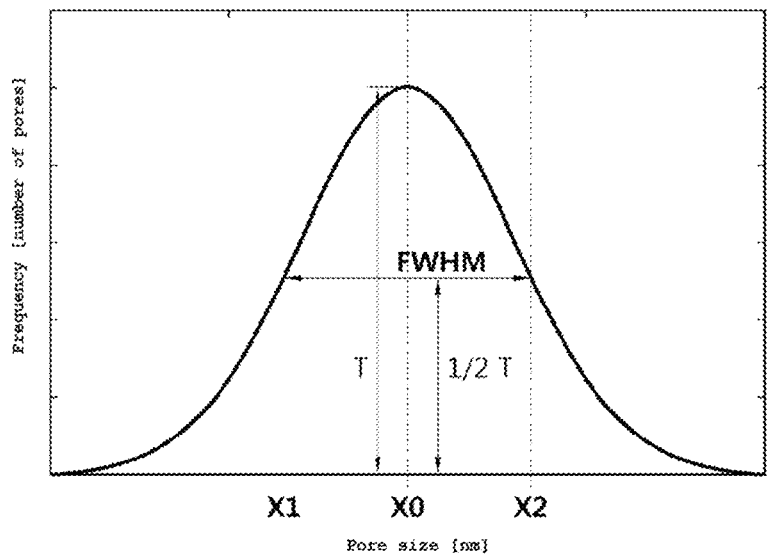
[FIG. 4]
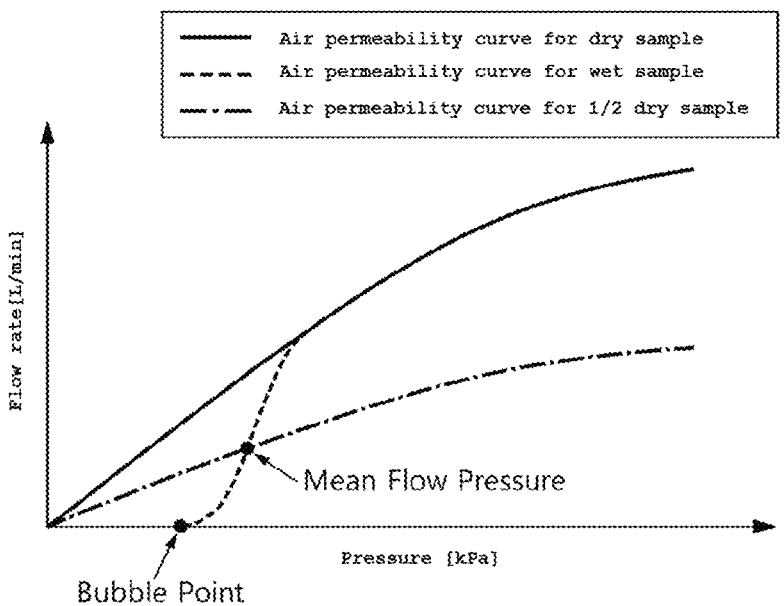

POROUS SUBSTRATE FOR SEPARATOR AND SEPARATOR FOR ELECTROCHEMICAL DEVICE COMPRISING SAME

TECHNICAL FIELD

This application claims priority based on Korean Patent Application No. 10-2021-0059551 filed on May 7, 2021. The present disclosure relates to a separator for an electrochemical device, in which the electrochemical device may be a primary battery or a secondary battery, and the secondary battery may include a lithium ion secondary battery.

BACKGROUND ART

Polyolefin microporous membranes are widely used for separators for batteries such as lithium batteries, diaphragms for electrolytic capacitors, moisture-permeable waterproof clothing, various filtration membranes, and the like. When such a polyolefin microporous membrane is used as a battery separator, its performance is closely related to battery characteristics, productivity, and safety. Therefore, in particular, lithium ion battery separators are required not only to have excellent mechanical properties and permeability but also to have a shutdown function (shutdown characteristic), thermal shrinkage resistance, etc., in which the shutdown function refers to a function of stopping the battery reaction by an action in which pores of the separator are closed due to abnormal heat to prevent battery heat generation, ignition, and rupture accidents caused by short-circuiting of external circuits or overcharging from an external circuit, and the thermal shrinkage resistance means the ability to maintain the shape of the separator even at high temperatures to prevent a dangerous situation in which the positive electrode material and the anode material directly react.

In general, a microporous film formed only of polyethylene has a low meltdown temperature, and a microporous film formed only of polypropylene has a high shutdown temperature. Accordingly, a battery separator composed of a microporous film made of polyethylene and polypropylene as main components has been proposed.

For example, Japanese Patent No. 3235669 discloses a battery separator that is excellent in thermal shrinkage resistance and shutdown characteristics. This separator includes: at least one first layer formed of a polymer selected from low-density polyethylene, ethylene-butene copolymer, and ethylene-hexene copolymer; and at least one second layer formed of a polymer selected from high-density polyethylene, ultra-high molecular weight polyethylene, and polypropylene.

For example, Japanese Patent No. 3422496 discloses a battery separator with excellent shutdown characteristics. This separator includes: at least one first layer formed of a polymer selected from ethylene-butene copolymer, ethylene-hexene copolymer, ethylene-methacrylate copolymer, and polyethylene; and at least one second layer formed of a polymer selected from polyethylene and polypropylene.

Japanese Patent No. 2883726 discloses a separator for batteries having excellent shutdown and meltdown characteristics. Polypropylene having a melting point of 150° C. or higher and polyethylene having a melting point of 100° C. to 140° C. are simultaneously extruded, and the obtained laminated film is uniaxially stretched at a temperature of −20° C. [the melting point of polyethylene (Tm0)−30° C.], and further stretched in the same direction at a temperature of (Tm0−30)° C. to (Tm0−2)° C. to form porosity.

Japanese Patent Application Publication No. Hei 11-329390 discloses a battery separator that is excellent in shutdown characteristics and strength. This battery separator includes two polypropylene microporous strengthened layers and a filler-containing polyethylene barrier layer interposed therebetween, in which the polyethylene barrier layer is composed of a microporous membrane manufactured by a particle stretching method.

A battery is manufactured by bonding such a separator to an electrode, and the bonding is performed by a lamination process in which the electrode and the separator are stacked, and then heat and pressure are applied to the laminate. The higher the heat and pressure applied in the lamination process, the higher the adhesion with the electrode. Recently, the processing speed has been increased to improve productivity, resulting in a decrease in the time for which heat is applied to the separator. For this reason, to obtain a satisfactory adhesive strength, the pressure is increased. This leads to a problem in that the separator is deformed by high pressure. In particular, when a porous substrate for a separator that is vulnerable to heat and pressure is used, a large thickness reduction occurs, and the pore damage is significant. Therefore, not only the performance of the battery but also the breakdown voltage of the separator is reduced, resulting in hi-pot failure and low voltage failure. Therefore, it is necessary to develop a porous polymer film substrate for a separator that has little deformation, even under high-pressure lamination conditions.

DISCLOSURE

Technical Problem

An objective of the present disclosure is to provide a porous substrate for a separator having a low thickness deformation rate and a high dielectric breakdown voltage and a separator including the same. It will be readily apparent that the objectives and advantages of the present disclosure may be realized by means or methods and combinations thereof recited in the claims.

Technical Solution

The present disclosure relates to a porous substrate for a separator, comprising a polyolefin-based polymer resin, wherein the polyolefin-based polymer resin comprises polyethylene and/or polypropylene, and the porous substrate has a porous structure having a plurality of pores, a porosity in a range of 30 to 60 vol %, and 4.0 nm or less of a full width at half maximum (FWHM) of a Gaussian pore distribution.

A second aspect of the present disclosure is that, in the first aspect, the FWHM is 3.0 nm or less, preferably 2.0 nm or less.

A third aspect of the present disclosure is that, in the first or second aspect, the difference between the maximum pore size (Mps) and the average pore size (mps) of the porous substrate is 30 nm.

A fourth aspect of the present disclosure is that, in any one of the first to third aspects, the difference between the maximum pore size (Mps) and the average pore size (mps) of the porous substrate is 20 nm.

A fifth aspect of the present disclosure is that, in the third aspect, the average pore size (mps) is in a range of 10 to 100 nm.

A sixth aspect of the present disclosure is that, in the third aspect, the average pore size (mps) is in a range of 20 to 30 nm.

A seventh aspect of the present disclosure is that, in any one of the first to sixth aspects, the porous substrate has a Brunauer-Emmett-Teller (BET) in a range of 20 to 60 m²/g.

An eighth aspect of the present disclosure is that, in any one of the first to seventh aspects, the porous substrate has a thickness in a range of 5 to 20 μm.

An ninth aspect of the present disclosure is that, in any one of the first to eighth aspects, the polymer resin comprises 90% by weight or more of a polyolefin-based resin based on 100% by weight of the polymer resin.

An tenth aspect of the present disclosure is that, in any one of the first to tenth aspects, wherein the polymer resin has a polydispersity index (PDI) in a range of 2.5 to 6.5.

In addition, the eleventh aspect of the present disclosure relates to a separator for an electrochemical device, in which the separator includes a porous substrate for a separator according to any one of the first to tenth aspects and a heat-resistant layer formed on one surface or both surfaces of the porous substrate, in which the heat-resistant layer includes a binder resin and inorganic particles.

In addition, a twelfth aspect of the present disclosure relates to an electrochemical device and includes an anode, a cathode, and the separator according to the eleventh aspect interposed between the anode and the cathode.

Advantageous Effects

The porous substrate, according to the present disclosure, has a small pore size and a uniform pore distribution. When the substrate is used in a separator, in the case where the separator and the electrode are laminated and put into a lamination process together, the thickness change is small, and the dielectric breakdown voltage is high.

DESCRIPTION OF DRAWINGS

The drawings attached to the present specification illustrate a preferred embodiment of the present disclosure and serve to better understand the technical idea of the present disclosure together with the contents of the present disclosure, and thus the present disclosure is not limited to and interpreted. On the other hand, the shape, size, scale, or ratio of elements in the drawings included in this specification may be exaggerated to emphasize a clearer description.

FIG. 1 is a cross-sectional view of a porous substrate of a Comparative Example and shows a schematic representation of a state of deformation due to compression;

FIG. 2 is a cross-sectional view of the porous substrate of the Example and shows a schematic representation of a state of deformation due to compression;

FIG. 3 exemplarily shows a Gaussian distribution of pores for confirming the FWHM of the pore size; and FIG. 4 exemplarily shows graphs of a dry sample curve, a wet sample curve, and a ½ dry sample curve obtainable through a porometer.

BEST MODE

Hereinafter, the present disclosure will be described in detail. Before proceeding, it should be noted that the terms or words used in this specification and claims should not be interpreted solely based on their conventional or dictionary meanings. The inventor must properly understand the concept behind each term to effectively describe their disclosure. Based on the principle that it can be defined, and it should be interpreted as meaning and concept consistent with the technical idea of the present disclosure. Therefore, since the configurations described in the embodiments described herein are only the most preferred embodiments of the present disclosure and do not represent all the technical ideas of the present disclosure, it should be understood that there may be various equivalents and modifications that may replace them at the time of the present application.

Throughout this specification, when a part "includes" a certain component, it means that other components may be further included, rather than excluding other components, unless otherwise stated.

In addition, the terms "about", "substantially", etc., used throughout this specification are used as meanings at or close to the numerical values when manufacturing and material tolerances inherent in the stated meanings are presented to aid the understanding of the present application. It is used to prevent an unconscionable infringer from using the mentioned disclosure in an unreasonable way.

Throughout this specification, the description of "A and/or B" means "A or B or both".

The present disclosure relates to a porous substrate that can be applied to a separator for an electrochemical device. In the present disclosure, the electrochemical device is a device that converts chemical energy into electrical energy by an electrochemical reaction and is a concept including a primary battery and a secondary battery, and the secondary battery is capable of charging and discharging and is a concept including a lithium ion battery, a nickel-cadmium battery, a nickel-hydrogen battery, and the like.

Separator

In the present specification, the separator serves as a porous ion-conducting barrier that allows ions to pass while blocking electrical contact between the anode and the cathode in the electrochemical device. It is preferable that a plurality of pores is formed in the separator, and the pores are interconnected to each other so that gas or liquid can pass through from one side to the other side of the separator.

The separator, according to the present disclosure, includes a porous substrate made of a polymer material including a plurality of pores. The separator may further include an additional layer disposed on at least one surface of the porous substrate, if necessary, in terms of material or function. In one embodiment of the present disclosure, the separator may include the porous substrate and a heat-resistant layer, and for example, the heat-resistant layer may be formed on at least one surface of the porous substrate. The heat-resistant layer may contain inorganic particles and/or a binder resin.

In one embodiment of the present disclosure, the inorganic particles in the heat-resistant layer may be provided in a layered structure in which the inorganic particles are bound by a binder resin, and the separator substrate has a porous structure due to the space (interstitial volume) formed between the inorganic particles. This porous structure has the effect of improving the electrolyte retention ability of the separator. On the other hand, in one embodiment of the present disclosure, when the separator includes a heat-resistant layer when the total volume of the separator is indicated as 100%, the heat-resistant layer accounts for 3 to 40 vol %. When the whole thickness of the separator is indicated as 100%, the heat-resistant layer accounts for 5% to 50% of the thickness of the separator.

Porous Substrate

In one embodiment of the present disclosure, the porous substrate may have a form of a porous sheet, including a polymer resin and having a plurality of pores. The pores include open pores, and the open pores are structured to be connected to each other so that gas or liquid can pass through the porous substrate from one side to the other. In one embodiment of the present disclosure, the porous substrate preferably has an air permeability of 2000 sec/100 ml or less and a porosity of 30 to 60 vol % in terms of battery output and cycle characteristics.

In the present disclosure, the air permeability (sec/100 ml) refers to the time in seconds required for 100 ml of air to pass through a sample such as a porous substrate or a separator having a size of 1 square inch under constant air pressure. In one embodiment of the present disclosure, the air permeability may be measured according to standard regulations in the art. For example, the air permeability may be measured using a known Gurley Densometer according to ASTM D 726-58 or ASTM D726-94. For example, air permeability may be the time in seconds for 100 ml of air passing through a sample of 1 square inch (or 6.54 cm²) under an air pressure of 0.304 (kPa) or water pressure of 1.215 kN/m². According to another embodiment, the air permeability may be expressed in seconds by measuring 100 ml of air to pass through a sample of 1 square inch under constant pressure of 4.8 inch $H_2O$ at room temperature according to the Gurley measurement method of the Japanese Industrial Standard (JIS-P8117). In one embodiment of the present disclosure, the air permeability may be measurable using, for example, Asahi Seiko EG01-55-1MR equipment according to the above standard regulations.

The porosity refers to the ratio of the volume occupied by the pores to the total volume, and vol % is used as its unit and can be used interchangeably with terms such as space porosity and multi-porosity. In the present disclosure, the measurement of the porosity is not particularly limited, and a method known in the art may be applied. For example, the measurement of the porosity can be measured by Brunauer-Emmett-Teller (BET) measurement method using nitrogen gas, water intrusion porosimeter method, capillary flow porometer, or mercury infiltration method (Hg porosimeter). Alternatively, in one embodiment of the present disclosure, the porosity of the porous substrate may be calculated from the difference between the apparent density and the net density, in which apparent density is obtained from the measurement of the porous substrate and the net density of the porous substrate is calculated from the composition ratio of the materials contained in the porous substrate and the density of each component. For example, the porosity can be calculated by the following [Formula 1].

Porosity (vol %)={1−(apparent density/net density)}×100     [Formula 1]

On the other hand, the apparent density in the above formula can be calculated from the following [Formula 2].

Apparent density (g/cm³)={weight of porous substrate [g]/(thickness of porous substrate [cm]× area of porous substrate [cm²])}     [Formula 2]

In the present disclosure, the porous substrate has a small and uniform pore size and can exhibit excellent shape stability and dielectric voltage characteristics when applied to a separator for an electrochemical device.

In the present disclosure, the porous substrate has a maximum pore size (Mps) of 80 nm or less and a difference between the maximum pore size (Mps) and average pore size (mps) of 30 nm or less, preferably 20 nm or less. In addition, the average pore size (mps) preferably has a range of 10 to 100 nm.

In one embodiment of the present disclosure, the pore size can be calculated from a pore size distribution measured using a capillary flow porometer method. The capillary flow porometer may be measured using a Porous Materials Inc. porometer and a the galwick solution, and reference may be made to the measurement method described below.

As a specific example, the relationship between air pressure and the flow rate was measured using a porometer for each of the porous substrates in a dry state (dry sample) and the porous substrate in a wet state (wet sample), and as shown in FIG. 4, the dry sample ventilation curve (dry curve) and wet sample ventilation curve (wet curve) are obtained, and the size and distribution of pores may be confirmed.

In the capillary flow pore measurement method, after wetting the porous substrate using a wetting solution with low surface tension, the pore size is measured through a pressure required to push out the wet liquid filling the pores of the porous substrate by pressing using a gas. For example, after the porous substrate to be measured is wetted with a wetting solution such as the galwick solution, the air pressure on one side of the porous substrate is gradually increased. At this time, when the applied air pressure is greater than the capillary attraction of the wetting solution present in the pores, the wetting solution blocking the pores is pushed out, and the pore size and distribution can be measured through the pressure and flow rate at the moment of being pushed out. In one embodiment of the present disclosure, a non-reactive gas may be used in place of the air.

In a specific embodiment of the present disclosure, the measurement may be performed in a range of a measured pressure of 0 to 3500 MPa, and within the range, the minimum air pressure may be 30 psi or more, and the maximum air pressure may be 500 psi or less.

The minimum air pressure may mean a bubble point pressure. The bubble point means the pressure at the starting point where the pressure curve is drawn in the capillary flow porometer and may reflect the maximum pore size among the pore diameters of the porous substrate. That is, when the air pressure is gradually increased, the wetting solution filled in the pores of the separator substrate is pushed and moved by the pressure in the order of pores having a large diameter, and accordingly, the air flow rate is gradually increased and the sample is finally dried. Here, the pressure at the starting point where the wetting solution moves is called the bubble point pressure.

Meanwhile, the maximum air pressure may be the pressure when the sample is finally in a dry state and may reflect the minimum pore size. Alternatively, the maximum air pressure may mean pressure at a point where the pressure curve (wetting curve) of the capillary flow porometer measured using the wetting solution meets the ventilation curve of the dry sample. The "ventilation curve of the dry sample (dry curve)" is the pressure distribution required to push out the existing gas filling the pores by pressurizing the separator substrate in a dry state that is not infiltrated with the wetting solution using air or a non-reactive gas.

FIG. 4 shows a pressure curve of a wet sample and a pressure curve of a dry sample using a capillary flow pore measurement method, and a point where the pressure curve of the wet sample and the pressure curve of the dry sample meet may be a maximum air pressure.

On the other hand, in the present disclosure, the condition under which air of pressure P enters pores with a diameter D can be expressed by the formula of Washburn shown in the following [Formula 3] with the surface tension of the wetting solution as γ and the contact angle of the wetting solution as θ.

$P = (4\gamma \cos \theta)/D$     (Formula 3)

Therefore, the diameter of the pores can be calculated by measuring the pressure when the wetting solution is extruded from the pores.

On the other hand, when the air flow rate of the wet sample at pressure Pj is Fw,j, and the air flow rate of the dry sample is Fd,j, the cumulative filter flow rate (CFF, unit:%) and pore diameter distribution (PSF: pore size frequency, unit:%) are calculated by Formulae 4 and 5, respectively.

$$CFF=[(Fw,j/Fd,j) \times 100] \quad \text{(Formula 4)}$$

$$PSF=(CFF)j+1-(CFF)j \quad \text{(Formula 5)}$$

By combining Formulae 3 to 5 above, a pore size distribution curve representing the relationship between the pore diameter D and the pore diameter distribution PSF can be obtained based on the pressure change of the air flow rate in the dry state and the wet state. An example of such a pore diameter distribution curve is shown in FIG. 3. From the pore diameter distribution curve shown in FIG. 3, various physical property values related to pores can be obtained.

In one embodiment of the present disclosure, a bubble point may represent a maximum diameter of a pore and a point where a curve of a wet sample and a curve of a dry sample meet may represent a minimum diameter of a pore. In addition, the point at which the air permeability curve for ½ dry sample, which is a value corresponding to ½ the value of the air permeability curve for a dry sample, and the wet sample curve are met, may represent the average pore diameter (see FIG. 4).

In addition, in the present disclosure, the porous substrate has a full width at half maximum peak height (FWHM) of 4.0 nm or less, 2.0 nm or less, or 1 nm or less in a pore diameter distribution (see FIG. 3) according to a normal distribution (Gaussian distribution) measured through the pore size distribution. Preferably the FWHM may be 3.0 nm or less. The full width at half maximum is defined as the difference in size between two points on the x-axis, which is half the maximum value (mode among pore sizes) on the y-axis in the normal distribution for the pore size distribution shown by classifying pores formed inside the porous substrate according to their sizes. In the distribution, the x-axis represents the size (diameter) of the pores, and the y-axis represents the frequency of the number of pores corresponding to the size of the pores on the x-axis (the number of pores or the percentage of the number of pores, etc.). In the present disclosure, the unit of the x-axis may be expressed in nm or μm. Referring to FIG. 3, the full width at half maximum (FWHM) can be expressed as the difference between two points $X_2$ and $X_1$ on the x-axis corresponding to ½ (½T) of the mode T on the y-axis. The difference may be expressed as an absolute value. Meanwhile, the normal distribution may represent symmetric and asymmetric, and arbitrary distributions other than normal with respect to a maximum value.

In a preferred embodiment of the present disclosure, the full width at half maximum may be determined from a distribution of pores other than pores having the largest diameter. Meanwhile, in the present disclosure, the shape of the pores may be circular, oval, or amorphous, and the cross-section may be a closed curve. The diameter of the pores means the longest length among the distances between any two points in the closed curve. When the above range is satisfied, the porous substrate has a small pore size and a high pore size uniformity. A porous substrate having such characteristics has high shape stability and can exhibit a high dielectric breakdown voltage.

Meanwhile, the porous substrate preferably has a BET surface area in the range of 20 to 60 m²/g. The larger the BET surface area, the higher the porosity and the smaller the pore size. Also, at the same porosity, the smaller the pore size, the larger the BET surface area. In the present disclosure, the BET surface area can be measured using the adsorption formula of the BET (Brunauer, Emmett, and Teller) model, and when the adsorption isotherm curve is measured up to 1 bar (1 atm) at the boiling point temperature of nitrogen at −196° C., the adsorption amount can be measured from the measured $N_2$ adsorption isotherm.

In the present disclosure, the porous substrate may have a thickness in a range of 5 to 20 μm in terms of thinning and high energy density of the electrochemical device. When the thickness of the porous substrate is less than the above range, the function of the conductive barrier is not sufficient, whereas when the thickness exceeds the above range (i.e., too thick), the resistance of the separator may be excessively increased.

On the other hand, in one embodiment of the present disclosure, the polymer resin may include a thermoplastic resin having a melting point of less than 200° C. from the viewpoint of imparting a shutdown function and preferably may include at least one of polyolefin resins. The shutdown function refers to a function preventing the thermal runaway of the battery by blocking the movement of ions between the cathode and the anode by closing the pores of the porous substrate by melting the polymer resin when the battery temperature is high.

Examples of polyolefin-based resin may include polyethylene, polypropylene, polybutene, polypentene, and the like and may include one or a mixture of two or more thereof. As a specific example, the polyolefin-based resin may include two or more selected from polyethylene, polypropylene, and polypentene. In another example, the polyolefin-based resin may be polyethylene and/or polypropylene.

In a specific embodiment of the present disclosure, the porous substrate includes polyethylene substrate and may additionally include polypropylene if necessary. At this time, the content of polypropylene is 0% to 5% by weight based on 100% by weight of the substrate. For example, the content of polypropylene may be less than 5% by weight. Meanwhile, in one embodiment of the present disclosure, the polyethylene may have a weight-average molecular weight (Mw) in a range of 300,000 to 1,800,000 g/mol, preferably 300,000 to 1,500,000 g/mol, or 300,0000 to 1,000,000 g/mol or 300,000 to 500,000 g/mol, in terms of implementing a compression rate range described later.

Meanwhile, in the present disclosure, the polyolefin-based resin is preferably included in an amount of 90% by weight or more or 95% by weight or more based on 100% by weight of the polymer material.

Examples of polyolefin-based resin may include one or a mixture of two or more selected from the group consisting of polyethylene, polypropylene, polybutene, and polypentene. Specifically, the polyolefin-based resin may be polyethylene and/or polypropylene.

Meanwhile, in a specific embodiment of the present disclosure, the polymer resin preferably has a polydispersity index (PDI) value in the range of 2.5 to 6.5. In one embodiment, when two or more types of polymer resins are mixed, the mixed polymer resin may satisfy the PDI. In a more preferred embodiment, with respect to 100% of the polymer resin satisfying the above PDI range, any one type of polymer resin as a single component accounts for more than 50% by weight, 70% by weight or more, or 90% by weight or more. The polymer resin may be composed of only a single component. The single component means that the chemical structure of the polymer resin (particularly the repeating unit) is the same, and the PDI satisfies the range of 2.5 to 6.5.

In a specific embodiment of the present disclosure, 90% by weight or more of polyethylene having PDI 2.5 to 6.5 may be included based on 100% by weight of the polymer material.

As described above, when the PDI value is satisfied, or the content range of the polymer resin is satisfied, uniformity may be improved in terms of the size and distribution of pores in the polymer substrate. Meanwhile, the polydispersity index can be obtained from the ratio of number-average molecular weight (Mn)/weight-average molecular weight (Mw).

Meanwhile, in the present disclosure, the weight-average molecular weight (Mw) and the number-average molecular weight (Mn) may be measured by gel permeation chromatography (GPC), PL GPC220, Agilent Technologies), and the measurement conditions may be set as follows.

Column: PL Olexis (Polymer Laboratories Co.)
Solvent: TCB (Trichlorobenzene)
Flow rate: 1.0 ml/min
Concentration of a sample: 1.0 mg/ml
Injection amount: 200 µl
Column temperature: 160° C.
Detector: Agilent High-Temperature RI detector
Standard: Polystyrene (corrected by cubic function)

In another embodiment, the polymer material may have a melting index (MI) in the range of 0.02 to 1.0 g/10 min. The MI is based on a condition in which a load of 21.6 kg is applied at 190° C.

In one embodiment of the present disclosure, the porous substrate may include polypropylene, but the content of polypropylene in the porous substrate is preferably controlled to 5% by weight or less, for example, less than 5% by weight. The higher the polypropylene content, the lower the crystallinity of the polymer. Accordingly, even though the porosity is high and the penetration strength is low, the compressibility or permanent set does not decrease, and the hi-pot defect rate, which is a dielectric voltage characteristic, can be maintained at a low level. However, if the content of polypropylene goes beyond the recommended range while preparing a porous substrate using the wet method, the raw material may become chemically unstable and hinder the formation of well-defined pores. That is, it is disadvantageous in terms of the development of porous properties, the content of polypropylene is preferably controlled to fall within the range described above.

In addition, when the polypropylene content is high, it is easier to manufacture by using a dry method than a wet method to obtain a porous substrate with well-developed pores, and when the dry manufacturing method is applied, it is difficult to control the thickness of the porous substrate to be thinner than when the wet manufacturing method is applied.

On the other hand, in one specific embodiment of the present disclosure, the porous substrate may further include at least one among polymer resins such as polyethylene terephthalate, polybutylene terephthalate, polyacetal, polyamide, polycarbonate, polyimide, polyetheretherketone, polyethersulfone, polyphenylene oxide, polyphenylene sulfide, and polyethylene naphthalate.

In one embodiment of the present disclosure, the porous substrate of a polymer material satisfying the above thickness range may be prepared through a wet manufacturing method by applying polyethylene.

Meanwhile, in a specific embodiment of the present disclosure, the porous substrate may be a porous polymer film prepared in the manner described below and may be a single layer film or a multilayer film formed by laminating two or more sheets.

In the present disclosure, the separator satisfying the above values improves the dielectric voltage characteristic of the battery, resulting in an increase in the breakdown voltage and a decrease in the short circuit occurrence rate (hi-pot defect rate) even under high voltage conditions.

On the other hand, in the present disclosure, the dielectric breakdown voltage is the highest voltage that the insulator can withstand, and the dielectric breakdown means that when a voltage is applied to the insulator when the voltage exceeds a certain value, the insulator is destroyed and the insulation performance is lost.

In one embodiment of the present disclosure, the dielectric voltage characteristic may be confirmed by a method of measuring a dielectric breakdown voltage of the separator, which is an insulator, by disposing a separator between two conductors and applying a voltage to measure a voltage at which the dielectric breakdown occurs.

This dielectric breakdown voltage may be measured by, for example, an AC/DC/IR Hi-Pot tester. For example, a stainless-steel mesh and a porous substrate are hot-press-bonded at 90° C., 4 MPa, and 1 sec conditions, and then the DC current is set to 0.5 mA, voltage boost to 100 V/s (voltage 3 kV, ramp-up time 3 s). When the experiment starts, the measurement is completed when a short circuit occurs as the voltage rises, and the voltage at that time is defined as the dielectric breakdown voltage.

In addition, in one embodiment of the present disclosure, the evaluation of the hi-pot defect rate can be measured by determining the voltage represented by the lower 1% of samples exhibiting a low dielectric breakdown voltage through Weibull analysis among the total number of specimens tested.

Method for Preparing a Porous Substrate

In one embodiment of the present disclosure, the porous substrate may be prepared by a method for producing a polymer film, preferably a wet method. For example, the wet manufacturing method includes preparing the mixture S1, extruding the mixture and forming an extruded sheet S2, stretching the extruded sheet S3, removing the pore-forming agent S4, and heat-setting of the extruded sheet S5.

In the step S1, a type of polymer resin is appropriately selected considering the final physical properties of the separator, and the selected polymer resin is mixed with a pore-forming agent. The polymer resin may be referred to the above-described content of the porous substrate polymer resin. For example, the polymer resin may be a polyolefin-based polymer resin. Examples of polyolefin-based polymer resin may include one polymer selected from polyethylene, such as high-density polyethylene, linear low-density polyethylene, low-density polyethylene, or ultra-high molecular weight polyethylene, polypropylene, polybutylene, polypentene, or a combination of two or more thereof.

The pore-forming agent is a material that is dispersed in a polymer, exhibits heterogeneity of a substrate prepared through extrusion, stretching, and the like and is subsequently removed from the substrate. Accordingly, the part of the substrate where the pore-forming agent was located remains in the form of pores of the substrate. The pore-forming agent is preferably a material that is liquid in the extrusion process, but a material that maintains a solid state may also be used. The pore-forming agent may be an aliphatic hydrocarbon-based solvent such as liquid paraffin, paraffin oil, mineral oil, or paraffin wax; vegetable oils such as soybean oil, sunflower oil, rapeseed oil, palm oil, coconut oil, corn oil, grapeseed oil, cottonseed oil, and the like; or a plasticizer such as a dialkyl phthalate. In particular, the plasticizer may be di-2-ethylhexyl phthalate (DOP), di-butyl-phthalate (DBP), di-isononyl phthalate (DINP), di-isodecyl phthalate (DIDP), butyl benzyl phthalate (BBP), and the like. Among these, liquid-state paraffin (LP, also referred to as "liquid paraffin") is particularly preferred.

In addition, the content of the pore-forming agent during the preparation of the separator may be appropriately adjusted to achieve a desired level of porosity. Considering the aspect of improving air permeability, it is preferable that the content of the pore-forming agent is high, but when the pore-forming agent is contained in an excessively excessive amount, the strength of the finally produced substrate may be adversely affected. Accordingly, the content of the pore-forming agent may be 1% to 80% by weight based on 100% by weight of the total amount of polymer resin and the pore-forming gent, and may be adjusted to 70% by weight or less, 60% by weight or less, or 50% by weight or less within the above range as necessary, and may be adjusted to 1% by weight or more, 20% by weight or more, 40% by weight or more. On the other hand, in a specific embodiment of the present disclosure, in terms of implementing an appropriate porosity of the porous substrate, for example, in order to implement a porosity of about 45% or less, the pore-forming agent may be included in the range of 1% to 60% by weight with respect to 100% by weight of the total amount of polymer resin and the pore-forming agent.

Next, the mixture prepared in the above step is extruded through an extruder to obtain an extruded sheet. The extruder is not particularly limited and may be an extruder commonly used in the art, such as but not limited to, an extruder having a T-die or a tubular die attached thereto. Although the extrusion process may be performed at a conventional extrusion temperature, it is preferable that the extrusion process is performed at a temperature condition of 10° C. to 100° C. higher than the melting point of the polymer resin used. When the extrusion process excessively exceeds the above range, the polymer resin is thermally decomposed to make it difficult to form a film, and the physical properties of the manufactured substrate are degraded, which is not preferable. An extruded sheet may be obtained through this extrusion process.

Thereafter, the extruded sheet is put into a stretching process. This stretching process is performed through a stretching machine commonly used in the art. The stretching machine may be a sequentially biaxial stretching machine but is not particularly limited thereto. By stretching the extruded sheet in this way, the mechanical strength of the porous substrate can be increased. The stretching process is performed in the machine direction (MD, machine direction, longitudinal direction) and/or transverse direction (TD, vertical direction). The stretching process in all or one of these directions increases the tensile strength in the corresponding stretching direction. If necessary, the separator of the present disclosure may be manufactured by performing longitudinal (MD) stretching and/or transverse (TD) stretching alone in one direction (for example, uniaxial stretching), simultaneously or sequentially in two directions (for example, biaxial stretching) in the stretching process. On the other hand, in one embodiment of the present disclosure, the temperature of the stretching film may be controlled to 100° C. to 130° C., preferably 110° C. to 125° C. For example, the temperature of the film during stretching may be controlled in a range of 115° C. to 121° C. When the stretching process is performed in the above temperature range, a film having small and uniform pores may be obtained.

Next, the pore-forming agent is removed from the extruded sheet obtained above. The pore-forming agent is removed by extraction with a solvent and drying. In addition, through this removal process, the space occupied by the pore-forming agent is formed as pores. The solvent that can use for extraction of the pore-forming agent may be any solvent capable of extracting the pore-forming agent. Still, it is suitable for using methyl ethyl ketone, methylene chloride, hexane, etc., with high extraction efficiency and fast drying. Preferably, the solvent may be methylene chloride, such as methylene dichloride (MC). As the extraction method, all common solvent extraction methods, such as an immersion method, a solvent spray method, and an ultrasonic method, may be used individually or in a combination thereof.

After the extraction of the pore-forming agent, heat setting the substrate is performed, thereby finally obtaining a separator having desired physical properties, porosity, and air permeability. The heat setting step may be performed using a heating device capable of applying an appropriate temperature required for heat setting, for example, an oven. In particular, the previously dried film is finally subjected to heat setting in order to reduce the shrinkage of the final film by removing the residual stress. Heat setting is to remove residual stress by forcibly holding the film to be contracted by applying heat while the film is fixed. A high heat setting temperature is advantageous for lowering the shrinkage rate, but if the heat setting temperature is too high, the membrane is partially melted, thereby clogging the formed pores and lowering the permeability. The thermal setting temperature is preferably selected in a temperature range in which approximately 10 to 30% by weight of the crystalline portion of the film melts. If the heat setting temperature is selected to be lower than the temperature at which about 10% by weight of the crystalline part of the film melts, the reorientation of polyethylene molecules in the film is insufficient, and there is no effect of removing the residual stress of the film. If the heat setting temperature is selected to be higher than the temperature at which about 30% by weight of the crystalline part of the film melts, the pores are blocked by the partial melting, thereby lowering the permeability.

In one embodiment of the present disclosure, the porous substrate may be a single layer. Alternatively, the porous substrate may be a laminate in which two or more films are stacked. At this time, at least one of the films included in the laminated film may be formed by the above-described method.

Heat Resistant Layer

In one embodiment of the present disclosure, the separator may include a heat resistance layer formed on at least one surface of the porous substrate. The heat-resistant layer includes an adhesive binder resin and inorganic particles, has a plurality of micropores inside thereof, and is structured such that these micropores are connected to each other. The heat-resistant layer is structurally unique in that it is a porous layer that allows gas or liquid to pass from one side to the opposite side. In one embodiment of the present disclosure, he binder resin and the inorganic particles in the heat resistance layer may be included in a weight ratio of 1:99 to 30:70. The ratio may be appropriately adjusted within the above range, for example, when the sum of the binder resin and the inorganic particles is 100% by weight, the binder resin may be 1% by weight or more, 5% by weight or more or 10% by weight or more, and the inorganic particles may be 80% by weight or more, 85% by weight or more, 90% by weight or more, or 95% by weight or more. In the present disclosure, it is preferable that the heat resistance layer has a porous structure from the viewpoint of ion permeability.

In the heat-resistant layer, the inorganic particles are bonded to each other by the binder resin, and pores may be formed due to an interstitial volume between the inorganic particles. The interstitial volume is a space defined by inorganic particles substantially facing each other in a closed-packed or densely-packed structure of the inorganic particles.

In one embodiment of the present disclosure, the porosity of the heat-resistant layer may be 30 vol % to 70 vol %, and within this range, the porosity may be 35 vol % or more, 40 vol % or more, and may be 65 vol % or less or 60 vol % or less, each independently. For example, the porosity may be in the range of 40 vol % to 60 vol %. When the porosity is 70 vol % or less, it is possible to secure mechanical properties that can withstand the pressing process performed to bond the separator to the electrode, and the surface opening ratio is not increased to an excessively high level. Therefore, a porosity that is 70 vol % or less is suitable for obtaining good adhesion. On the other hand, when the porosity is 30 vol % or more, it is advantageous in terms of ion permeability.

In the present disclosure, the porosity may be measured using an adsorbed gas such as nitrogen and BELSORP (BET equipment) manufactured by BEL JAPAN, or may be measured by a method such as mercury intrusion porosimeter. Alternatively, in one embodiment of the present disclosure, on the basis of the density (apparent density) of an obtained electrode (electrode active material layer), the content ratio of the materials included in the electrode (electrode active material layer), and the density of each component of the electrode active material layer, the net density of the electrode active material layer is calculated. In addition, the porosity of the electrode active material layer can be calculated from the difference between the apparent density and the net density.

The thickness of the heat-resistant layer may be in the range of 1 to 6 μm on one side of the porous substrate. Within the above range, the heat resistance layer may have a thickness of 2 μm or more or 3 μm or more, if necessary. Adhesion to the electrode is excellent within the above numerical range, and as a result, the cell strength of the battery is increased. On the other hand, when the thickness is 6 μm or less, it is advantageous in terms of cycle characteristics and resistance characteristics of the battery. From this point of view, the thickness is preferably 4 μm or less, and more preferably 3 μm or less.

In the present disclosure, non-limiting examples of binder resins that can be used for the heat-resistant layer may include at least one polymer resin selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethyl pullulan, cyanoethyl polyvinylalcohol, cyanoethyl cellulose, cyanoethyl sucrose, pullulan, and carboxyl methyl cellulose, or a mixture of two or more thereof. However, the present disclosure is not particularly limited thereto.

In a specific embodiment of the present disclosure, the inorganic particles usable in the heat-resistant layer are not particularly limited as long as they are electrochemically stable. That is, the inorganic particles that can be used in the present disclosure are not particularly limited as long as oxidation and/or reduction reactions do not occur in the operating voltage range of the applied electrochemical device (e.g., 0 to 5 V based on $Li/Li^+$).

Non-limiting examples of the inorganic particles include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), Hafnium ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, aluminum peroxide, zinc tin hydroxide ($ZnSn(OH)_6$), tin-zinc oxide ($Zn_2SnO_4$, $ZnSnO_3$), antimony trioxide ($Sb_2O_3$), antimony tetraoxide ($Sb_2O_4$), antimony pentoxide ($Sb_2O_5$), etc., and the inorganic particles may include one or two or more thereof.

Independently or in combination with the components exemplified above, the inorganic particles may include inorganic particles having lithium ion transport capability. Such non-limiting examples of the inorganic particles having the lithium ion transport ability may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z$) $(PO_4)_3$, $0<x<2$, $0<y<1$, $0<z<3$). $(LiAlTiP)_xO_y$-based glass ($0<x<4$, $0<y<13$), such as, $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, etc., lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as $LiI$—$Li_2S$—$P_2S_5$, etc., or a mixture thereof.

In addition, the average diameter (D50) of the inorganic particles is not particularly limited but is preferably in the range of 0.3 to 1 μm in order to form a coating layer having a uniform thickness and an appropriate porosity. When the average diameter of the inorganic particles is less than 0.3 μm, the dispersibility of the inorganic particles in the slurry prepared for preparing the heat-resistant layer may be reduced, and when the average diameter of the inorganic particles is more than 1 μm, the thickness of the formed coating layer may increase.

In one embodiment of the present disclosure, a method of forming the heat resistance layer is, for example, as follows. At first, a polymer solution is prepared by dissolving a binder resin in an appropriate organic solvent. It is preferable that the solvent may have a solubility parameter similar to that of the binder polymer to be used and a boiling point that is low. This is to facilitate uniform mixing and subsequent solvent removal. Non-limiting examples of the solvent that can be used may include acetone, tetrahydrofuran, methylene chloride, chloroform, dimethylformamide, N-methyl-2-pyrrolidone (NMP), cyclohexane, water, or a mixture thereof.

Thereafter, inorganic particles are added and dispersed in the prepared polymer solution. In the present disclosure, the content ratio of the inorganic particles and the binder is as described above and is appropriately adjusted in consideration of the thickness, pore size, and porosity of the heat-resistant layer of the present disclosure that is finally manufactured.

Next, the inorganic particle slurry prepared above is applied to at least one side of the separator and dried. A method of applying the slurry on the separator substrate is not particularly limited, and a conventional coating method known in the art may be used. For example, various methods such as dip coating, die coating, roll coating, comma coating, or a mixture thereof may be used.

In the drying process, temperature and time conditions are appropriately set to minimize the occurrence of surface defects on the surface of the composite porous layer. The drying may be performed by a drying aid device such as a drying oven or hot air within an appropriate range.

In addition, the separator of the present disclosure can also be manufactured by a method in which the heat-resistant layer and the porous substrate are separately prepared, and the sheets are overlapped and combined, and combined by thermal compression or adhesive. Examples of a method for obtaining the heat-resistant layer as an independent sheet include a method in which the slurry is applied on a release sheet, the heat-resistant layer is formed by the method described above, and only the heat-resistant layer is peeled off.

Meanwhile, the present disclosure provides a secondary battery including the separator. The battery includes an anode, a cathode, and a separator interposed between the anode and the cathode, and the separator is a low-resistance separator having the above-described characteristics.

In the present disclosure, the cathode includes a cathode current collector and a cathode active material layer, including a cathode active material, a conductive material, and a binder resin on at least one surface of the current collector. The cathode active material may include one or a mixture of two or more among layered compounds such as lithium manganese oxide ($LiMn_2O_4$, $LiMnO_2$, etc.), lithium cobalt oxide ($LiCoO_2$), lithium nickel oxide ($LiNiO_2$), or a compound substituted with one or more transition metals; lithium manganese oxides of the formula $Li_{1+x}Mn_{2-x}O_4$ (where x is 0 to 0.33), $LiMnO_3$, $LiMn_2O_3$, $LiMnO_2$, and the like; lithium copper oxide ($Li_2CuO_2$); vanadium oxides such as $LiV_3O_8$, $LiV_3O_4$, $V_2O_5$, and $Cu_2V_2O_7$; Ni site-type lithium nickel oxide represented by the formula $LiNi_{1-x}M_xO_2$ (where M=Co, Mn, Al, Cu, Fe, Mg, B, or Ga, and x=0.01 to 0.3); lithium manganese composite oxides represented by the formula $LiMn_{1-x}M_xO_2$ (where M=Co, Ni, Fe, Cr, Zn, or Ta and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$.

In the present disclosure, the anode includes an anode current collector and an anode active material layer including an anode active material, a conductive material, and a binder resin on at least one surface of the current collector. The anode may include, as an anode active material, at least one component or a mixture of two or more selected from the group consisting of lithium metal oxide, carbons such as non-graphitized carbon, and graphite-based carbon; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of groups 1, 2, and 3 of the periodic table, halogen; $0 < x \le 1$; $1 \le y \le 3$; $1 \le z \le 8$); lithium metal; lithium alloy; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and titanium oxides.

In one specific embodiment of the present disclosure, the conductive material may be, for example, any one selected from the group consisting of graphite, carbon black, carbon fiber, or metal fiber, metal powder, conductive whisker, conductive metal oxide, activated carbon, and polyphenylene derivatives, or a mixture of two or more conductive materials. More specifically, the conductive material may be one selected from the group consisting of natural graphite, artificial graphite, super-p, acetylene black, Ketjen black, channel black, furnace black, lamp black, thermoblack, Denka black, aluminum powder, nickel powder, zinc oxide, potassium titanate, and titanium oxide, or a mixture of two or more of these conductive materials.

The current collector is not particularly limited as long as it has high conductivity without causing a chemical change in the battery, and for example, stainless steel, copper, aluminum, nickel, titanium, calcined carbon, or surface treatment material of aluminum or stainless steel with carbon, nickel, titanium, silver, etc., may be used.

As the binder resin, a polymer commonly used for electrodes in the art may be used. Non-limiting examples of such binder resins may include polyvinylidene fluoride-co-hexafluoropropylene, polyvinylidene fluoride-co-trichlorethylene, polymethylmethacrylate, polyethylhexyl acrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, and carboxyl methyl cellulose and the like, but are not limited thereto.

The electrode assembly prepared as described above may be loaded in an appropriate case, and electrolyte may be injected to manufacture a battery.

In the present disclosure, the electrolyte solution is a salt having the same structure as $A^+B^-$, and $A^+$ includes ions formed of alkali metal cations such as $Li^+$, $Na^+$, $K^+$, or a combination thereof, or $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof, including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (γ-butyrolactone), but is not limited thereto.

In addition, the present disclosure provides a battery module including a battery including the electrode assembly as a unit cell, a battery pack including the battery module, and a device including the battery pack as a power source. Specific examples of the device include a power tool powered by a battery motor; electric vehicles, including electric vehicles (EVs), hybrid electric vehicles (HEVs), plug-in hybrid electric vehicles (PHEVs), and the like; electric two-wheeled vehicles, including electric bicycles (E-bikes) and electric scooters (E-scooter); electric golf carts; and a power storage system, but is not limited thereto.

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

EXAMPLE

1. Preparation of a Porous Substrate

Example 1

30 parts by weight of polyethylene resin (Mw 475,500 g/mol, PDI 3.6) and 70 parts by weight of liquid paraffin oil (kinetic viscosity at 40° C.: 40 cSt) were put into a twin screw extruder, kneaded, and then extruded. After the extrusion, the extruded object passed through a T-die and a cooling casting roll to form a sheet and then biaxially stretched by a tenter-type simultaneous stretcher of TD stretching after MD stretching. Liquid paraffin oil as a diluent was extracted from the stretched sheet with methylene chloride and heat-set at about 128° C. to obtain a porous substrate for a separator.

Example 2

30 parts by weight of polyethylene resin (Mw 930,800 g/mol, PDI 3.3) and 70 parts by weight of liquid paraffin oil (kinetic viscosity at 40° C.: 40 cSt) were put into a twin screw extruder, kneaded, and then extruded. After the extrusion, the extruded object passed through a T-die and a cooling casting roll to form a sheet, followed by sequential stretching (MD stretching+TD stretching) with a tenter-type sequential stretching machine. Liquid paraffin oil as a diluent was extracted from the stretched sheet with methylene chloride and heat-set at about 128° C. to obtain a porous substrate for a separator.

Comparative Example 1

A polyethylene resin composition was prepared by mixing a first polyethylene resin (having a weight average molecular weight (Mw) of 250,000 g/mol) and a second polyethylene resin (having a weight average molecular weight (Mw) of 800,000 g/mol). The composition had a molecular weight (Mw) of 497,000 g/mol and a PDI of 12.8. Next, a porous substrate for a separator was obtained in the same manner as in the above example.

Comparative Example 2

A polyethylene resin composition was prepared by mixing a first polyethylene resin (having a weight-average molecular weight (Mw) of 250,000 g/mol) and a second polyethylene resin (having a weight-average molecular weight (Mw) of 800,000 g/mol). The composition had a molecular weight (Mw) of 381,000 g/mol and a PDI of 10.5. Next, a porous substrate for a separator was obtained in the same manner as in the above example.

The porous substrates obtained in each Example and Comparative Example are summarized in [Table 1] below.

TABLE 1

|  | Example 1 | Example 2 | Comparative Example 1 | Comparative Example 2 |
|---|---|---|---|---|
| Average pore size (nm) | 25 | 30 | 27 | 28 |
| Max pore size (nm) | 32 | 45 | 65 | 77 |
| Difference between average pore size (mps) and maximum pore size (Mps) (nm) | 7 | 15 | 38 | 49 |
| Full width at half maximum (nm) | 0.8 | 2.6 | 4.2 | 5.1 |
| Porosity (vol %) | 45 | 45 | 45 | 45 |
| BET surface area (m$^2$/g) | 47 | 39 | 43 | 41 |
| Air permeability change rate (%) | 10 | 11 | 67 | 86 |
| Thickness change rate (%) | 4 | 6 | 14 | 18 |
| Dielectric breakdown voltage (V) | 1590 | 1,323 | 494 | 475 |

2. Evaluation of Physical Properties of Porous Substrates (1) Regarding Pore Size Distribution A sample was obtained with a size of 5 cm in the TD direction and 5 cm in the MD direction at the central portion in the width direction of the porous substrate obtained in each Example and Comparative Example. For each sample obtained, a drying curve was obtained using a Perm-Porometer (CFP-1500A) manufactured by Porous Materials Inc. (PMI). In addition, a wet curve was obtained after filling the porous substrate with the galwick solution. The measurement pressure was in the range of 0 to 3500 MPa. From this, the maximum pore size (Mps), average pore size (mps), full width at half maximum value, and the difference between the maximum pore size (Mps) and average pore size (mps) were calculated. In addition, the calculated pore size distribution results are shown in FIG. 3.

In the obtained curve, the bubble point may represent the maximum diameter of pores and the point where the curve of the wet sample and the dry sample meet may represent the minimum diameter of the pores. In addition, the point at which the air permeability curve for ½ dry sample, which is a value corresponding to ½ the value of the air permeability curve for a dry sample, and the wet sample curve are met, may represent the average pore diameter (see FIG. 4).

(2) BET Surface Area Measurement

When the adsorption isotherm was measured up to 1 bar at −196° using a BET-specific surface area analyzer (BEL, Microtrac Co.) for the porous substrates obtained in each Example and Comparative Example, the BET surface area was calculated using the Brunauer-Ennett-Teller model (BET) from the measured $N_2$ adsorption isotherm.

(3) Porosity Measurement

The porosity was calculated through [Formula 1] and [Formula 2] below.

Porosity (vol %)={1−(apparent density/net density)}×100  [Formula 1]

Apparent density (g/cm$^3$)={weight of porous substrate [g]/(thickness of porous substrate [cm]× area of porous substrate [cm$^2$])}  [Formula 2]

Three samples having a size of 5 cm in the MD/TD direction were obtained from the porous substrates of each Example and Comparative Example. For the thickness of the porous substrate, an average value was used after measuring 5 points for each sample, and the weight of each sample was measured using a scale. The average value of the three samples was calculated and introduced into Formulae 1 and 2 above to calculate the porosity. On the other hand, the net density in each sample was applied based on theoretically confirmed numerical values such as molecular weight for each applied component.

(4) Measurement of Air Permeability and Air Permeability Change Rate

Air permeability was confirmed for the porous substrates obtained in each Example and Comparative Example. Air permeability was measured according to the Fraser test method according to ASTM D 737, and an air permeability tester manufactured by Asahi Seiko Co., Ltd. EG01-55-1MR was used.

[Air Permeability Tester Device Setting Conditions]

Measured pressure: 0.5 kg/cm$^2$, cylinder pressure: 2.5 kg/cm$^2$, set time: 10 seconds At least 10 specimens were extracted from the porous substrate obtained in each Example and Comparative Example, and the average of data was described.

Meanwhile, after hot pressing each porous substrate at 90° C., 4 MPa, and 1 sec, the air permeability was measured, and the air permeability change rate (%) of each porous substrate was calculated through Formula 3 below.

[(Initial air permeability−air permeability after pressing)/initial air permeability]×100  [Formula 3]

(5) Thickness Change Rate

The initial thickness and the thickness after pressing the porous substrate were measured using a contact thickness meter. Measurements were performed at 5 mm intervals over a distance of cm along the TD direction of the porous substrate. The measurement along the TD direction was performed 5 times at different MD positions, and the arithmetic average was taken as the thickness of the porous substrate. On the other hand, the thickness change rate (%) of each porous substrate was calculated through [Formula 4] below.

[(Initial thickness−thickness after pressing)/initial thickness]×100  [Formula 4]

It was confirmed that the thickness change rate of the porous substrate of Example 1 was lower than that of Comparative Examples 1 and 2.

(6) Dielectric Breakdown Voltage

For each of the Examples and Comparative Examples, 30 specimens were prepared and their dielectric voltage characteristics were evaluated. After hot-pressing the stainless-steel mesh and the porous substrate under conditions of 90 C, 4 MPa, and 1 sec, the DC current was set to 0.5 mA and the voltage boost to 100 V/s (voltage 3 kV, ramp-up time 3 s). When the experiment started, the voltage rose, and the measurement was completed when a short circuit occurred in each specimen, and the voltage at that time was measured as the breakdown voltage. The voltage of the lower 1% of specimens showing low breakdown voltage was measured through Weibull analysis among the total number of specimens to be tested, and these are summarized in Table 1.

As confirmed in this experiment, in the case of the porous substrate according to the Example, the size of the pores is small and uniform, and thus the dielectric voltage characteristics and thickness change rate are excellent compared to the porous substrate according to the Comparative Example.

(7) Measurement of Polydispersity Index

The polydispersity index was calculated according to Formula 5 below.

Polydispersity index=number-average molecular weight (Mn)/weight-average molecular weight (Mw)  [Formula 5]

The weight-average molecular weight (Mw) and the number-average molecular weight (Mn) were measured by gel permeation chromatography (GPC) (PLGPC220, Agilent Technologies), and the measurement conditions were set as follows.

Column: PL Olexis (Polymer Laboratories Co.)
Solvent: TCB (1,2,4-trichlorobenzene, Wako Pure Chemical Industries, Ltd.)
Flow rate: 1.0 ml/min
Concentration of a sample: 1.0 mg/ml
Injection amount: 200 μl
Column temperature: 160° C.
Detector: Agilent High-Temperature RI detector
Standard: Polystyrene (corrected by cubic function)

The invention claimed is:

1. A porous substrate for a separator, comprising a polyolefin-based polymer resin,
    wherein the polyolefin-based polymer resin comprises polyethylene and/or polypropylene,
    the porous substrate has a porous structure having a plurality of pores, a porosity in a range of 30 to 60 vol %, and 1.0 nm or less of a full width at half maximum (FWHM) of a Gaussian pore distribution, and
    the polyethylene has a weigh-average molecular weight (Mw) in a rage of 300,000 to 1,000,000 g/mol,
    the polyolefin-based polymer resin has a polydispersity index (PDI) in a range of 3.6 to 6.5.

2. The porous substrate of claim 1, wherein a difference between a maximum pore size (Mps) and a mean pore size (mps) of the porous substrate is 30 nm or less.

3. The porous substrate of claim 1, wherein a difference between a maximum pore size (Mps) and a mean pore size (mps) of the porous substrate is 20 nm or less.

4. The porous substrate of claim 2, wherein the mean pore size (mps) is in a range of 10 to 100 nm.

5. The porous substrate of claim 2, wherein the mean pore size (mps) is in a range of 20 to 30 nm.

6. The porous substrate of claim 1, wherein the porous substrate has a Brunauer-Emmett-Teller (BET) in a range of 20 to 60 m$^2$/g.

7. The porous substrate of claim 1, wherein the porous substrate has a thickness in a range of 5 to 20 μm.

8. The porous substrate of claim 1, wherein the polyolefin-based polymer resin comprises 90% by weight or more of a polyolefin resin based on 100% by weight of the polyolefin-based polymer resin.

9. The porous substrate of claim 8, wherein the polymer resin has a polydispersity index (PDI) in a range of 2.5 to 6.5.

10. A separator comprising the porous substrate of claim 1 and a heat-resistant layer formed on either one surface or both surfaces of the porous substrate,
    wherein the heat-resistant layer comprises a binder resin and inorganic particles.

11. An electrochemical device comprising an anode, a cathode, and the separator according to claim 10 disposed between the anode and the cathode.

12. The porous substrate of claim 1, wherein the polyolefin-based polymer resin comprises polyethylene.

13. The porous substrate of claim 1, wherein the polyolefin-based polymer resin comprises polypropylene.

14. The porous substrate of claim 1, wherein a content of polypropylene is less than 5% by weight based on 100% by weight of the substrate.

15. The porous substrate of claim 1, wherein the porosity is in a range of 35 to 60 vol %.

16. The porous substrate of claim 1, wherein the porosity is in a range of 40 to 60 vol %.

17. The separator of claim 10, wherein a thickness of the heat-resistant layer is in a range from 1 to 6 μm.

18. The separator of claim 10, wherein a thickness of the heat-resistant layer is in a range from 2 to 4 μm.

* * * * *